Oct. 15, 1957 H. H. MUELLER 2,809,841

TONE ARM BALANCING MEANS FOR AUTOMATIC INTERLOCKING DUAL PHONOGRAPH RECORD PLAYER

Filed July 1, 1952 2 Sheets-Sheet 1

Herman H. Mueller
INVENTOR.

BY Clarence A. O'Brien and Harvey B. Jacobson
Attorneys

Oct. 15, 1957 H. H. MUELLER 2,809,841

TONE ARM BALANCING MEANS FOR AUTOMATIC INTERLOCKING DUAL PHONOGRAPH RECORD PLAYER

Filed July 1, 1952 2 Sheets-Sheet 2

Herman H. Mueller
INVENTOR.

BY Clarence A. O'Brien
and Harvey B. Jacobson
Attorneys

United States Patent Office 2,809,841

Patented Oct. 15, 1957

2,809,841

TONE ARM BALANCING MEANS FOR AUTOMATIC INTERLOCKING DUAL PHONOGRAPH RECORD PLAYER

Herman H. Mueller, Ephrata, Pa.

Application July 1, 1952, Serial No. 296,558

5 Claims. (Cl. 274—23)

This invention comprises novel and useful improvements in a tone arm balancing means for automatic interlocking dual phonograph record players and comprises a continuation-in-part of my prior application Serial No. 98,048, filed June 9, 1949, for Automatic Interlocking Dual Phonograph Record Player, and which has now matured into Patent No. 2,729,455 of January 3, 1956.

The primary object is to provide a tone arm construction having a predetermined and adjustable constant pressure of the stylus upon the record being played.

Another very important object of this invention is to provide an improved and advantageous construction of tone arm which shall maintain an adjustable but constant light pressure of the stylus upon both the top and bottom surfaces of a record held in a horizontal plane for playing; and wherein a very simple adjustable balancing means operating solely by gravity shall enable variation of the tone arm and stylus pressure on the record.

These, together with various ancillary features and objects of the invention, which will later become apparent as the following description proceeds, are attained by the present invention, a preferred embodiment of which has been illustrated, by way of example only, in the accompanying drawings, wherein.

Referring now more particularly to the accompanying drawings wherein similar numerals designate like parts throughout the various views, it will be noted that the same numerals are employed as those used for designating the corresponding parts in my above-identified patent.

Figure 1:
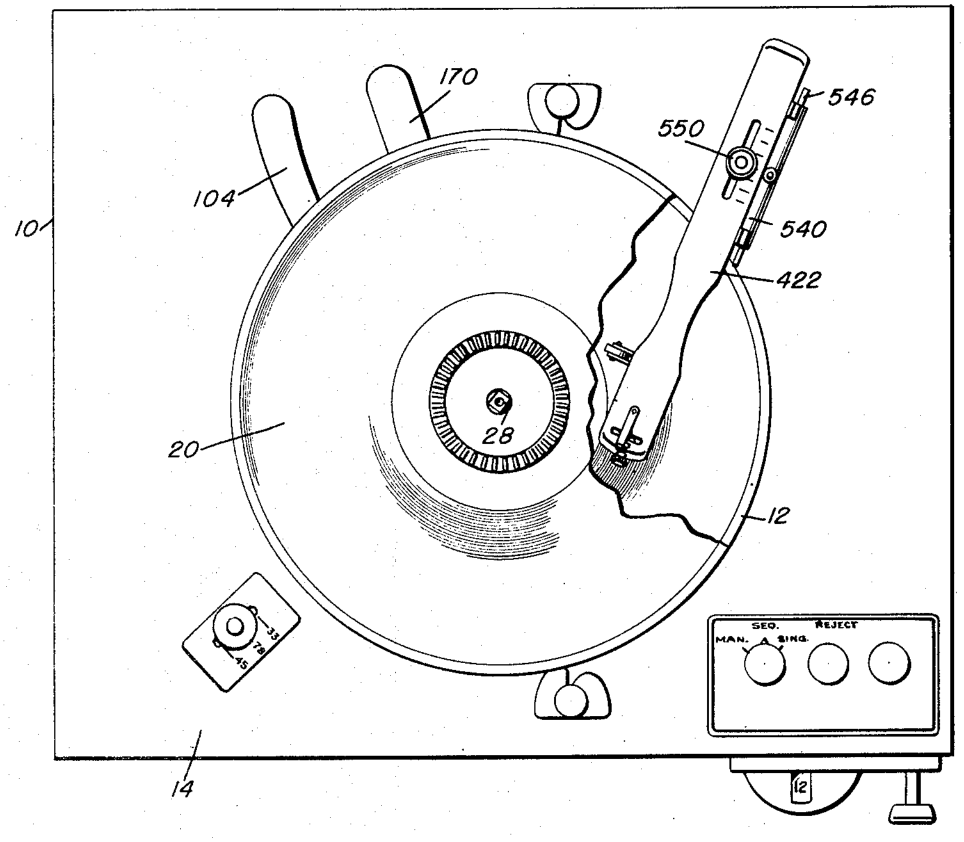
Figure 1 is a top plan view of an automatic phonographic apparatus constructed in accordance with the principles of this invention, parts being broken away.
Figure 6:
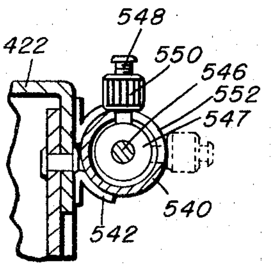
Figure 6 is a vertical transverse sectional detail view taken upon an enlarged scale substantially upon the plane indicated by the section line 6—6 of Figure 5, an alternative position of the parts being shown in dotted lines.

As shown in Figure 1, a casing or cabinet 10 of any desired or suitable construction is provided for housing the operating mechanism, a turntable 12 being rotatably mounted upon the top 14 of the casing. This turntable may be of a conventional design if desired, but preferably is one of the improved mounting and driving constructions set forth in my co-pending application Serial No. 296,382 for Turntable and Drive for Automatic Interlocking Dual Phonograph Record Player, filed June 30, 1952, and which constitutes a continuation-in-part of my prior Patent No. 2,729,455. The turntable serves to impart rotation to the records 20 as disclosed in my above patent. Where possible, the elements shown in the drawings of this application are designated by the same reference numerals employed in my above patent in order to facilitate a reference to that patent for consideration of the structure and operation of those elements, which in themselves, form no part of the invention set forth and claimed herein.

A hollow spindle 28 is mounted upon and extends upwardly from the top 14 of the casing and is provided with suitable mechanism, not shown, for receiving a record released from the stack of records at the top of the spindle, for lowering this record upon or lifting the record from the record supporting, spacing and driving means referred to hereinafter, and for lowering this record down upon the turntable or the stack of records received upon the turntable, such mechanism being fully set forth in detail in my prior patent.

The record driving, supporting and spacing means includes an arm 104 which is given a vertical motion, to raise or lower the arm 104 and is caused to swing or oscillate in a horizontal plane. These motions, incidentally, are imparted to the arm by a mechanism forming no part of the present invention claimed in this application, but set forth in detail in my prior patent.

At its outer extremity, the arm 104 has journaled thereon a plurality of supporting and driving rollers, not shown, three such rollers being generally found to be satisfactory for the purposes of this invention, these rollers having gear or toothed peripheries which are complementary to and mesh with the driving surface of the turntable 12, or the bottom and top driving surface of a record 20 when the latter is supported by the rollers or is disposed upon the turntable.

There is further provided a pressure arm 170 which is adapted to exert pressure upon the record directly resting upon the supporting and driving rollers to hold the record in positive, firm and non-slipping engagement with those rollers as well as to hold the rollers pressed against the driving surface of the turntable to prevent any possibility of slippage between the rotating turntable 12 and the rollers or a record resting thereon and the record which is being supported and driven by the rollers.

The pressure arm 170, with its operating mechanism, is disclosed in my prior patent.

The present invention is, however, particularly concerned with the provision of a balancing assembly for adjusting the pressure of a tone arm needle against the top or bottom side of a record disk, during the automatic playing of records in that type of record player disclosed in my prior patent.

The tone arm is rotatably pivoted for horizontal and vertical swinging movement, so that the tone arm is swung inwardly and outwardly in a horizontal plane and upwardly and downwardly in a vertical plane.

Figure 3:
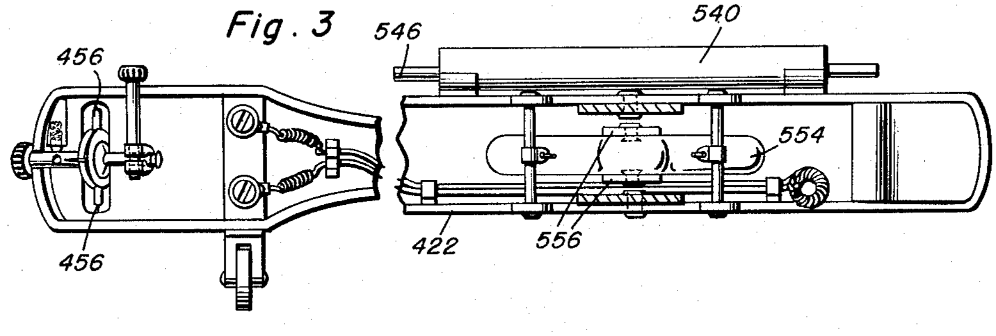
Figure 3 is a longitudinal horizontal sectional view of the tone arm taken substantially upon the plane indicated by the section line 3—3 of Figure 4, parts being broken away.

A U-shaped supporting member 464 is integrally formed or rigidly secured on the upper end of a hollow shaft 466 which extends upwardly from the bottom of the casing 10. The tone arm is pivotally secured to the opposing sides of the member 464 by rivets 476, as seen in Figure 3. A pair of longitudinally spaced transversely extending rods 478 and 480 are carried by the tone arm and a pair of flexible operating members 482 and 484 are secured by clips 486 on the rods.

As set forth in my prior patent, the tone arm 422 has sets of oppositely or diametrically disposed, micro needles or styluses 456 and conventional needles 458. Either set may be positioned to extend upwardly and downwardly from the tone arm and will then be positioned to play the bottom or top sides respectively of records when the tone arm is tilted to position a needle thereagainst.

The opposing ends of the operating members 482 and 484 are operated by suitable mechanism, to effect upward and downward tilting of the tone arm, as set forth in my prior patent.

Figure 7:
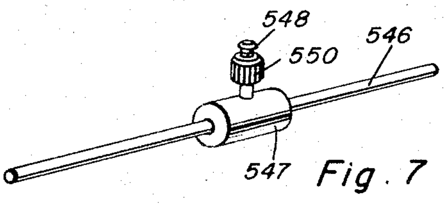
Figure 7 is a perspective view of an element forming a part of the assembly shown in Figure 5.
Figure 2:
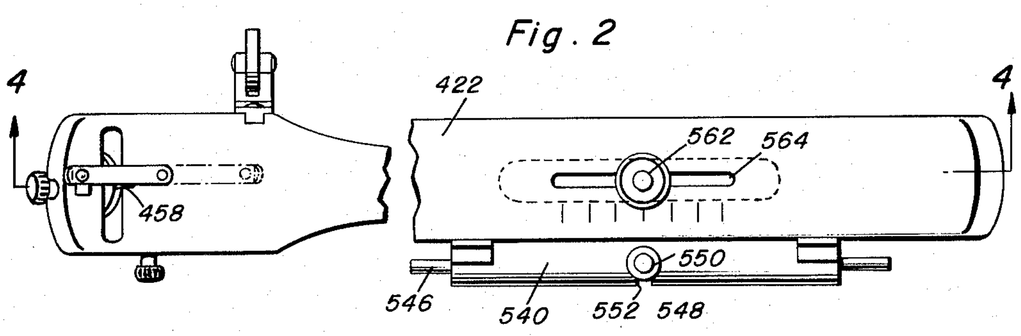
Figure 2 is a top plan view, parts being broken away, of the tone arm.

Means is provided for retaining one of the styluses in engagement, under a constant but adjustable pressure, with the sound track of the record to be played, the means being automatic and also manually operated. Thus, attention is directed to Figures 2–8, wherein it will be noted that an elongated split sleeve 540 is secured at its opposing ends by straps 542 to one side of the tone arm in parallel relation thereto. The sleeve is provided with a longitudinally extending slot 544 in the outer wall thereof. A rod 546, see especially Figure 7, which extends at its ends beyond the sleeve, is slidably and rotatably disposed within the sleeve. A weight 547, is slidably and rotatably disposed on the rod 546 and is formed with a laterally extending, externally threaded lug 548 upon which is threaded a locking nut 550. A laterally extending slot 552 communicates centrally with the longitudinally extending slot 544. Thus, the weight can freely slide on the rod or it can be locked in selected positions thereon or can be locked in a central position by disposing the lug 548 in the slot 552.

Figure 4:
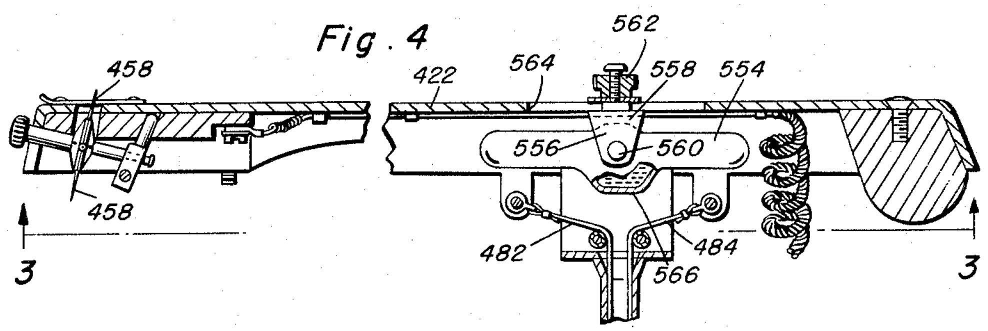
Figure 4 is a vertical longitudinal sectional view of the tone arm taken substantially upon the plane indicated by the section line 4—4 of Figure 2, parts being broken away.
Figure 5:
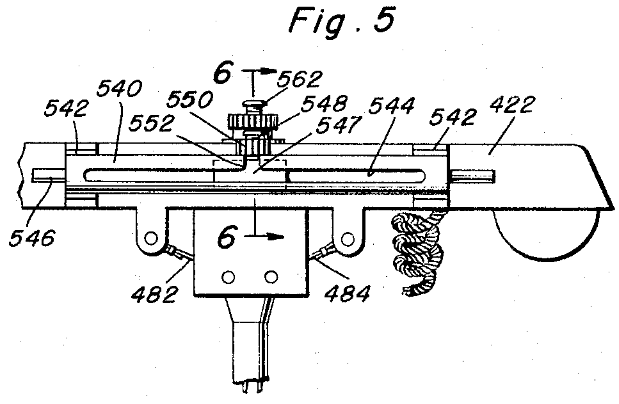
Figure 5 is a fragmentary side elevational view, parts being broken away, of the means for adjusting the pressure imparted by the stylus on the sound track of the record.

A tube 554, which may be filled with mercury or similar substance, is pivotally disposed between a pair of downwardly extending perforated legs 556 of a U-shaped bracket 558. The tube is centrally pivoted upon a horizontal pivot 560 between the legs. A locking and adjusting structure 562 is slidably disposed through a slot 564 formed in the tone arm and is connected to the web of the bracket 558, so as to adjust the longitudinal position of the tube within the tone arm. The tube is formed centrally with a protruding section 566, as seen in Figure 4. The tube being pivotally disposed on a horizontal axis as at 560 is automatic in operation to impart a sustaining pressure to the styluses in a tilted position.

Figure 8:
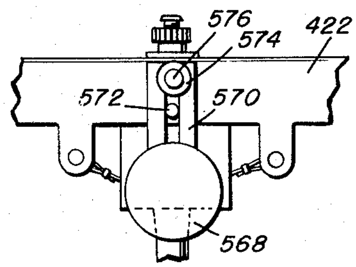
Figure 8 is a fragmentary side elevational view of a modified form of means for retaining the stylus under pressure on the sound track.

Another embodiment of adjustable tone arm pressure means is illustrated in Figure 8, wherein it is to be noted that a pendulum 568 is carried by a slotted arm 570, slidable on a lug 572 extending laterally from the tone arm and being secured by a locking nut 574 secured on an externally threaded stem 576 which extends laterally from the tone arm side wall. The pendulum structure may either be preset in an angular position or allowed to freely oscillate on the tone or pick-up arm.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claims.

Having described the invention, what is claimed as new is:

1. A tone arm assembly for phonograph record players comprising a tone arm, a needle assembly mounted on said tone arm and including a pair of upwardly and downwardly projecting needles for selectively playing the bottom and top sides respectively of records, a fulcrum support for said tone arm, a pivotal connection securing the intermediate portion of said tone arm to said fulcrum support for upward and downward tilting movement for the playing of the bottom and top sides of records, means for varying the pressure of the tone arm upon both sides of a record being played including an adjustable balancing assembly rigidly secured to said tone arm and positioned entirely at one side of the latter at said pivotal connection, said balancing assembly including means for adjustably shifting the center of gravity of the entire tone arm assembly longitudinally of the tone arm and to either side of the pivotal connection and for selectively biasing the tone arm needle assembly upwardly or downwardly to vary the pressure with which the tone arm engages the bottom or top side of a record when tilted thereagainst, a casing extending longitudinally of said tone arm to opposite sides of said pivot connection, a weight on said casing freely shiftable longitudinally thereof to opposite sides by the pivot connection upon tilting of the tone arm whereby to apply an additional fixed pressure to the needle assembly when the latter is tilted either upwardly or downwardly against a record disk.

2. The combination of claim 1 wherein the opposite ends of said casing are disposed at equal distances from the pivot connection.

3. A tone arm assembly for phonograph record players comprising a tone arm, a needle assembly mounted on said tone arm and including a pair of upwardly and downwardly projecting needles for selectively playing the bottom and top sides respectively of records, a fulcrum support for said tone arm, a pivotal connection securing the intermediate portion of said tone arm to said fulcrum support for upward and downward tilting movement for the playing of the bottom and top sides of records, means for varying the pressure of the tone arm upon both sides of a record being played including an adjustable balancing assembly rigidly secured to said tone arm and positioned entirely at one side of the latter at said pivotal connection, said balancing assembly including means for adjustably shifting the center of gravity of the entire tone arm assembly longitudinally of the tone arm and to either side of the pivotal connection and for selectively biasing the tone arm needle assembly upwardly or downwardly to vary the pressure with which the tone arm engages the bottom or top side of a record when tilted thereagainst, a casing extending longitudinally of said tone arm to opposite sides of said pivot connection, a weight on said casing freely shiftable longitudinally thereof to opposite sides by the pivot connection upon tilting of the tone arm whereby to apply an additional fixed pressure to the needle assembly when the latter is tilted either upwardly or downwardly against a record disk, said casing having a centrally depressed portion intermediate its ends for receiving said weight when the casing and tone arm are in non-tilted position.

4. A tone arm assembly for phonograph record players comprising a tone arm, a needle assembly mounted on said tone arm and including a pair of upwardly and downwardly projecting needles for selectively playing the bottom and top sides respectively of records, a fulcrum support for said tone arm, a pivotal connection securing the intermediate portion of said tone arm to said fulcrum support for upward and downward tilting movement for the playing of the bottom and top sides of records, means for varying the pressure of the tone arm upon both sides of a record being played including an adjustable balancing assembly rigidly secured to said tone arm and positioned entirely at one side of the latter at said pivotal connection, said balancing assembly including means for adjustably shifting the center of gravity of the entire tone arm assembly longitudinally of the tone arm and to either side of the pivotal connection and for selectively biasing the tone arm needle assembly upwardly or downwardly to vary the pressure with which the tone arm engages the bottom or top side of a record when tilted thereagainst, a casing extending longitudinally of said tone arm to opposite sides of said pivot connection, a weight on said casing freely shiftable longitudinally thereof to opposite sides by the pivot connection upon tilting of the tone arm whereby to apply an additional fixed pressure to the needle assembly when the latter is tilted either upwardly or downwardly against a record disk, means for adjusting the position of the casing longitudinally of the tone arm.

5. A tone arm assembly for phonograph record players comprising a tone arm, a needle assembly mounted on said tone arm and including a pair of upwardly and downwardly projecting needles for selectively playing the bottom and top sides respectively of records, a fulcrum support for said tone arm, a pivotal connection securing the intermediate portion of said tone arm to said fulcrum support for upward and downward tilting movement for the playing of the bottom and top sides of records, means for varying the pressure of the tone arm upon both sides of a record being played including an adjustable balancing assembly rigidly secured to said tone arm and positioned entirely at one side of the latter at said pivotal connection, said balancing assembly including means for adjustably shifting the center of gravity of the entire tone arm assembly longitudinally of the tone arm and to either side of the pivotal connection and for selectively biasing the tone arm needle assembly upwardly or downwardly to vary the pressure with which the tone arm engages the bottom or top side of a record when tilted thereagainst, a casing extending longitudinally of said tone arm to opposite sides of said pivotal connection, a weight on said casing freely shiftable longitudinally thereof to opposite sides by the pivot connection upon tilting of the tone arm whereby to apply an additional fixed pressure to the needle assembly when the later is tilted either upwardly or downwardly against a record disk, said casing being disposed within the interior of the tone arm.

References Cited in the file of this patent

UNITED STATES PATENTS

| | | |
|---|---|---|
| 989,544 | Graft | Apr. 11, 1911 |
| 1,560,231 | Hand | Nov. 3, 1925 |
| 2,236,599 | Hutter | Apr. 1, 1941 |
| 2,356,467 | Martin | Aug. 22, 1944 |
| 2,426,241 | Rodman | Aug. 26, 1947 |
| 2,506,692 | Thompson | May 9, 1950 |
| 2,526,188 | Andres | Oct. 17, 1950 |
| 2,551,506 | Rockwell | May 1, 1951 |
| 2,568,671 | Vistain | Sept. 18, 1951 |
| 2,572,712 | Fisher | Oct. 23, 1951 |
| 2,580,694 | Munroe | Jan. 1, 1952 |
| 2,597,113 | Lingenbrink | May 20, 1952 |
| 2,617,895 | Angle et al. | Nov. 11, 1952 |
| 2,628,843 | Comstock | Feb. 17, 1953 |
| 2,661,217 | Bidinger | Dec. 1, 1953 |

FOREIGN PATENTS

| | | |
|---|---|---|
| 419,299 | Great Britain | Nov. 5, 1934 |
| 585,543 | Great Britain | Feb. 11, 1947 |
| 611,658 | Great Britain | Nov. 2, 1948 |
| 643,773 | Great Britain | Sept. 27, 1950 |